United States Patent [19]
Hyde

[11] Patent Number: 5,960,377
[45] Date of Patent: Sep. 28, 1999

[54] SPEED CALCULATION DERIVED FROM DISTANCE PULSES UTILIZING ACCELERATION

[75] Inventor: Stephen L. Hyde, Clarkston, Mich.

[73] Assignee: Chrysler Corporation, Auburn Hills, Mich.

[21] Appl. No.: 08/715,813

[22] Filed: Sep. 16, 1996

[51] Int. Cl.⁶ ........................................... G01P 15/00
[52] U.S. Cl. .................... 702/148; 702/149; 702/147; 702/142; 701/93; 73/488; 73/511
[58] Field of Search ........................ 702/147–149, 702/33, 44, 78, 79, 96, 97, 142, 143, 145, 160, 165, 176, 178, 183, 187, 189; 364/174, 528.25, 528.39; 377/24.1, 24.2, 23, 19, 20, 9, 118; 73/1.37, 488–492, 510, 511, 514.39, 527–530, 866.2; 701/93, 96, 44; 340/943; 342/104, 117; 356/27

[56] References Cited

U.S. PATENT DOCUMENTS

| | | | |
|---|---|---|---|
| 4,849,892 | 7/1989 | McCombie | 364/426.04 |
| 5,103,413 | 4/1992 | Ohata | 702/96 |
| 5,222,024 | 6/1993 | Orita et al. | 701/93 |
| 5,636,145 | 6/1997 | Gorman et al. | 702/148 |
| 5,740,083 | 4/1998 | Anderson et al. | 377/20 |

*Primary Examiner*—Hal Dodge Wachsman
*Attorney, Agent, or Firm*—Mark P. Calcaterra

[57] ABSTRACT

The present invention provides a system which calculates vehicle speeds from distance pulses utilizing vehicle acceleration. More particularly, the present invention calculates vehicle speed through a system comprising a speed input task and a speed output task. The speed input task generates a speed value and an acceleration value from a pulse train delivered by a distance sensor or electronic transmission. The acceleration, deceleration or steady state of the motor vehicle is determined in the input task through use of the distance sensor tolerance. The output task drives the speedometer according to the new speed value from the input task if a new speed value has been generated since the last execution of the output task. If no new speed value has been generated since the last execution of the output task, the output task drives the speedometer according to the acceleration value. Thus, the output task is executed periodically regardless of the sequence of pulses received in the input task.

28 Claims, 3 Drawing Sheets

SPEED CALCULATION DERIVED FROM DISTANCE PULSES UTILIZING ACCELERATION

BACKGROUND OF THE INVENTION

1. Technical Field

This invention generally relates to a system for determining the speed of a motor vehicle. More particularly, the present invention relates to a system for calculating the speed of a motor vehicle from distance pulses utilizing acceleration.

2. Discussion

It is generally known in the automobile art that distances travelled and speeds obtained are determinable through interpretation of distance signals consisting of a series of distance pulses. Generally, a pulse generator is configured to generate a predetermined sequence of pulses, comprising a pulse train, corresponding to vehicle speed or distance travelled. The pulse train is interpreted in a controller and a value representing vehicle speed or distance travelled is calculated.

Distance sensors are commonly employed for generating such pulse trains and are usually factored to generate 8000 pulses per mile of vehicle travel or 8 pulses per distance sensor driving member revolution which roughly corresponds to wheel rotation. More recently, electronic transmissions have been substituted for mechanical transmissions. The electronic transmissions generate pulses mimicking the distance sensors by sensing vehicle speeds and generating a pulse train accordingly.

Distance sensors and electronic transmissions are adequate for fairly accurately incrementing motor vehicle odometers and for engine control operations. However, due to frequently inconsistent spacing between subsequent pulses along the pulse train, speed calculations based solely on pulse trains from distance sensors are crude, inaccurate, and unreliable. Distance sensors often generate pulses along a pulse train at different lengths from each other even though the vehicle is travelling at a constant speed. Thus, systems calculating speed with distance sensors or electronic transmissions require a controller to be implemented to improve system accuracy.

Generally, the controller roughly estimates vehicle velocity at speeds below a predetermined level, such as twenty miles per hour. At speeds in excess of the predetermined level, the spacing between pulses along the pulse train from the distance sensor or electronic transmission have become more frequent and permit more accurate speed calculations.

However, the signal generated by these systems is choppy and requires smoothing prior to driving the speedometer. A body controller is often required for smoothing the signal so that a smooth speedometer display is achieved. However, by adding smoothing or filtering, the system does not respond to changes in vehicle speed very well. Under extreme acceleration or deceleration conditions, the speedometer lags behind the true vehicle speed. Also, shifting is difficult to control when the calculated speed lags behind the true vehicle speed.

Additionally, none of the prior art systems accurately account for changes in vehicle velocity when computing vehicle speed. Acceleration or deceleration is accounted for merely by averaging a series of speed calculations together and attempting to distinguish between accelerating and decelerating states. Therefore, speed estimates overshoot and undershoot true vehicle speed.

Therefore, it is desirable to provide a system for calculating motor vehicle speed by accurately compensating for vehicle acceleration and deceleration to minimize speedometer lag. It is also desirable to provide a system for calculating motor vehicle speed which utilizes system tolerance for determining the acceleration, deceleration or steady state of the vehicle. It is further desirable to eliminate the smoothing step from the system and to provide a speed signal more quickly, smoothly and accurately than according to the prior art.

SUMMARY OF THE INVENTION

The above and other objects are provided by a system which calculates vehicle speeds from distance pulses utilizing vehicle acceleration. More particularly, the present invention calculates vehicle speed through a system comprising a speed input task and a speed output task. The speed input task generates a speed value and an acceleration value from a pulse train delivered by a distance sensor or electronic transmission. The acceleration, deceleration or steady state of the motor vehicle is determined in the input task through use of the distance sensor tolerance. The output task drives the speedometer according to the new speed value from the input task if a new speed value has been generated since the last execution of the output task. If no new speed value has been generated since the last execution of the output task, the output task drives the speedometer according to the acceleration value. Thus, the output task is executed periodically regardless of the sequence of pulses received in the input task.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
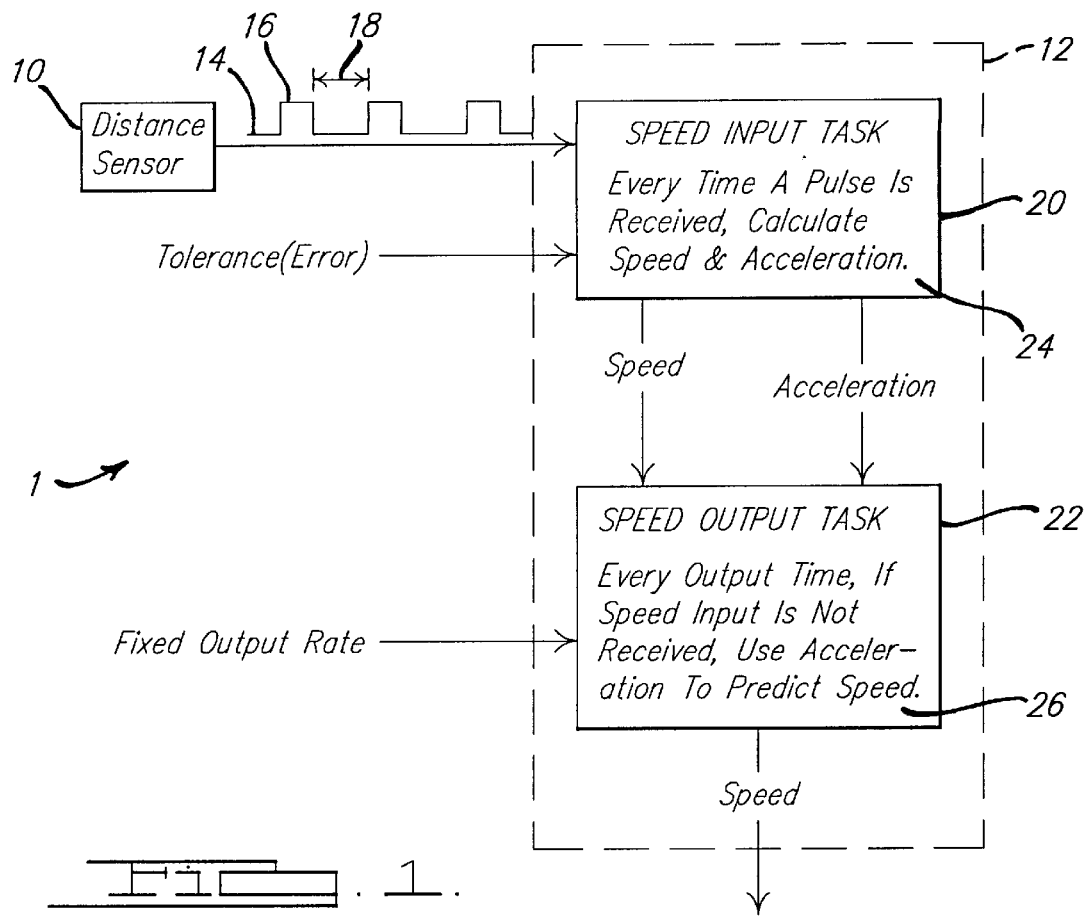
FIG. 1 is a block diagram of a system for calculating vehicle speed from distance pulses utilizing acceleration according to the present invention.

Referring to FIG. 1, a system for calculating vehicle speed from distance pulses utilizing acceleration according to the present invention is shown generally at 1. Generally, motor vehicles are equipped with a device for generating distance pulses corresponding to the distance the vehicle has travelled or the speed at which the vehicle is travelling. For instance, a distance sensor is often employed to generate 8000 pulses per mile travelled or 8 pulses per sensor driving unit revolution. Alternatively, an electronic transmission is employed to mimic the distance sensor.

The pulse trains generated by these devices have been found adequate for driving odometers and for most engine control operations. However, they have been deemed unreliable for driving vehicle speedometers and shifting during extreme accelerations. According to the present invention, a speedometer is driven to accurately indicate true vehicle speed without substantial lag between computation and display and without additional controllers or smoothing. Thus, a system is provided requiring fewer components and providing speed calculations more quickly and accurately than according to the prior art.

Still referring to FIG. 1, a distance sensor 10 electronically communicates with a controller 12 (in phantom) and delivers thereto a pulse train 14 including pulses 16. The pulses 16 comprising the pulse train 14 are spaced apart by distances 18 corresponding to the different speeds obtained or distances travelled by the vehicle. By measuring the distances 18 between the pulses 16, the speed of the vehicle or the distance the vehicle has travelled can be determined. It should be noted that various controllers are acceptable for measuring the time between pulses or determining the speed or distance, but the preferred system is implemented in an engine controller.

Within the controller 12, the system 1 performs a speed input task 20 and a speed output task 22. At the block 24, the speed input task 20 is shown. The speed input task 20 calculates a new vehicle speed and a new vehicle acceleration each time a pulse 16 is received within the controller 12. As will be described in greater detail below, to accomplish this, the speed input task 20 compares subsequent distances 18 between pulses 16 and utilizes the known tolerance of the distance sensor 10 to determine the acceleration, deceleration, or steady state of the vehicle.

At the block 26, the speed output task 22 is shown. The speed output task 22 is executed periodically at a fixed output rate independently of the input task 20. Thus, the output task 22 is executed regardless of the reception of a distance pulse 16 by the input task 20. In this way, a smooth speedometer display is ensured.

If a distance pulse 16 has been received by the input task 20 since the last execution of the speed output task 22, the new speed value is used to calculate the new vehicle speed. On the other hand, if a speed input pulse 16 has not been received since the last execution of the output task 22, the acceleration value calculated in the speed input task 20 is used to calculate the new vehicle speed. In either case, the speed output task 22 generates a value corresponding to the speed of the motor vehicle and drives the speedometer accordingly.

Figure 2:
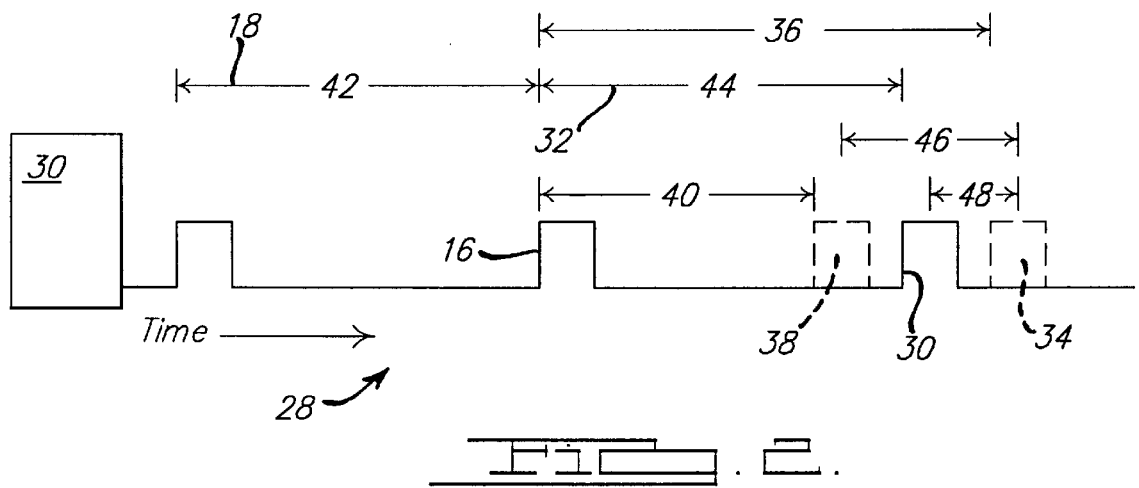
FIG. 2 is a schematic view of a pulse train having multiple pulse inputs thereon.

Referring now to FIG. 2, a pulse train is shown generally at 28. The pulse train 28 is generated and delivered by a pulse generator 30 to the engine controller 12. The pulse generator 30 may comprise a distance sensor, electronic transmission, or another controller. The spacing 18 between the pulses 16 corresponds to the speed obtained or distance travelled by the motor vehicle. As the speed of the vehicle changes, the distances 18 between the pulses 16 vary.

Therefore, if the vehicle is in a steady state, a pulse 30 is generated and the current distance 32 is essentially equal to the previous distance 18. However, if the vehicle is decelerating, a pulse 34 is generated and the current distance 36 between the pulse 16 and the pulse 34 is greater than the previous distance 18. Also, if the vehicle is accelerating, a pulse 38 is generated and the current distance 40 between the pulse 16 and the pulse 38 is less than the previous distance 18.

By comparing subsequent distances between pulses, the system 1 determines the vehicle speed and compensates for the acceleration, deceleration, or steady state of the vehicle. This is accomplished by detecting and saving the time between subsequent pulses and comparing them. Generally, the previous time 42 between pulses is detected and saved and is then compared to the current time 44 between pulses.

The system 1 utilizes the tolerance 46 of the pulse generator 30 for determining the accelerating, decelerating or steady state of the vehicle. Only pulses falling outside of the tolerance band 46 are utilized as acceleration or deceleration pulses. If a pulse is received within the tolerance band 46 of the system 1, it is assumed that the vehicle is in a moderately steady state. An acceleration or deceleration state is only satisfied when a pulse is received outside of the tolerance band 46.

If a pulse is received within the tolerance band 46, it is utilized in calculating a new vehicle speed by averaging it into the old speed value. However, since the pulse is within the tolerance band 46, the new speed value is not multiplied by a relatively large factor in the calculation. On the other hand, if a pulse is received outside of the tolerance band 46, it is multiplied by a relatively large factor and averaged with the old speed value to calculate a new vehicle speed. Thus, the tolerance 46 of the distance sensor 10 is accounted for each time a pulse is received.

Therefore, if the current time 44 plus the system error 48 is less than the previous time 42, the vehicle is in an accelerating state. However, if the current time 44 less the system error 48 is greater than the previous time 42, the vehicle is in a decelerating state. Finally, if the vehicle is not in an accelerating or decelerating state, the current time 44 plus or minus the system error is considered essentially equal to the previous time 42 and the vehicle is assumed to be in a moderately steady state. It should be appreciated that the maximum error 48 of the system 1 is equal to half of the distance sensor tolerance 46.

Figure 3:
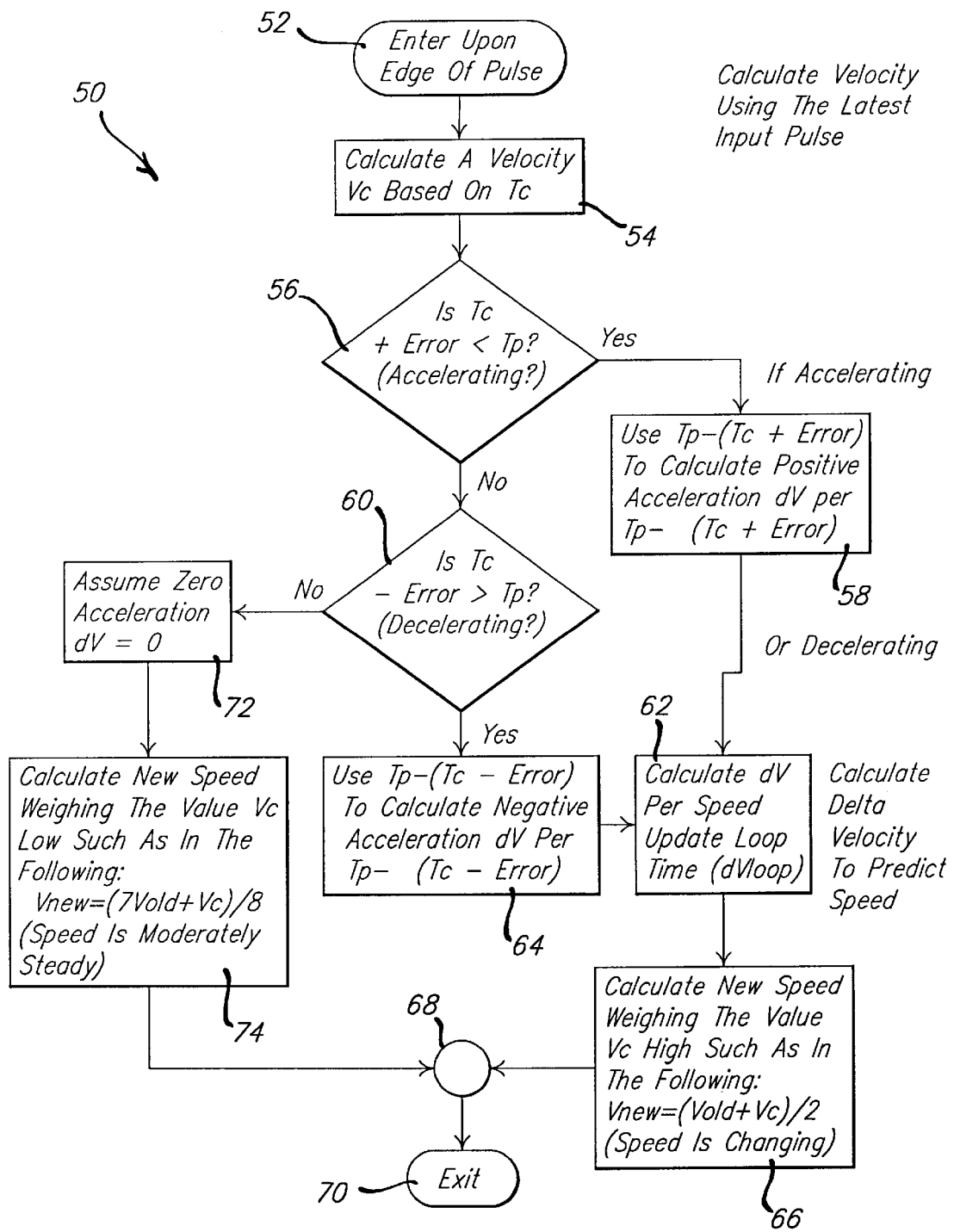
FIG. 3 is a flow chart depicting the input task methodology of a system for calculating vehicle speed from distance pulses utilizing acceleration according to the present invention.

Turning now to FIG. 3, a control methodology 50 for the input task 20 of the present invention is shown in greater detail. The methodology 50 enters through an initiator 52 on an edge of the input pulse 16. From the initiator 52, the methodology 50 continues to a process block 54, where a vehicle velocity is calculated based on the current time 44. As noted above, the current time 44 corresponds to the distance between the last two input pulses 16 received.

From the process block 54, the methodology 50 continues to a decision block 56, where the current time 44 is compared to the previous time 42 to determine if the vehicle is in an accelerating state. If the current time 44 plus the system error 48 is less than the previous time 42, the vehicle is accelerating. Accordingly, the methodology 50 advances to a process block 58 for further processing. However, if the current time 44 plus the system error 48 is greater than the previous time 42, the vehicle is not accelerating. Thus, the methodology 50 advances to a decision block 60.

In the process block 58, the acceleration of the vehicle is calculated. This is accomplished by dividing a time to velocity conversion constant based on 8,000 pulses mile, by the previous time 42 less the total of the current time 44 and the system error 48. The result is a value equal to the change in vehicle velocity over the current time 44.

From the process block 58 the methodology 50 continues to a process block 62 where the change in velocity is calculated per speed update loop time. The speed update loop time is equivalent to the time period when the speed output task is executed. The new speed value is calculated each update loop time so that the calculations based on acceleration will match the speed calculations based on pulses actually received.

Referring back to the decision block 60, the methodology 50 determines if the vehicle is in a decelerating state. This is accomplished by comparing a time including the current time 44 less the system error 48 to the previous time 42. If the time including the current time 44 less the system error 48 is greater than the previous time 42, the methodology 50 advances to a process block 64 where the negative acceleration, or deceleration, of the vehicle is calculated.

At the process block 64, the deceleration of the vehicle is determined by dividing a time to velocity conversion constant based on the 8,000 pulses per mile by the previous time 42 less the total of the current time 44 and the system error 48. The result is a value equal to the change in vehicle speed or deceleration. From the process block 64, the methodology 50 continues to the process block 62 where the change in velocity is calculated per speed update loop time as discussed in greater detail above.

From the process block 62, the methodology 50 advances to a process block 66, where a new speed is calculated. In this section of the methodology 50, it is known that a pulse was received in the input task 20 outside of the tolerance band 46. Therefore, the vehicle is in an accelerating or decelerating state.

Accordingly, the current velocity value is multiplied by a factor in the calculation of a new vehicle speed. It should be noted that the amount by which each value is multiplied is calibratable according to the particular system in which the present invention is implemented. However, it is preferable that the new velocity is calculated in this section of the methodology 50 by averaging the current velocity and the old velocity together giving both equal weight or 50% calculation influence. This is accomplished by adding the old velocity to the new velocity and dividing the total by two. The result is the new speed value. From the process block 66, the methodology 50 continues to the connector 68 and continues to the terminator 70.

Referring again to the decision block 60, if the time including the current time 44 less the system error 48 is less than the previous time 42, the methodology 50 advances from the decision block 60 to the process block 72. In this section of the methodology 50, it is known that a pulse was received in the input task 20 within the tolerance range 46. Therefore, the vehicle is in a moderately steady state. Accordingly, the methodology 50 assumes that the change in velocity is equal to zero.

From the process block 72, the methodology 50 continues to the process block 74 where the new vehicle speed is calculated. Since the methodology in this section is operating within an error range, the new speed value is calculated in the process block 74 by not multiplying the current velocity with as great a factor as in the process block 66. Preferably, the new velocity is calculated by multiplying the old velocity by a calibrated value such as seven, adding the current velocity thereto and dividing the total by the calibrated value plus one, such as eight. In this way, the old velocity is given greater influence in the calculation then the current velocity and the potential for false speed values is reduced. From the process block 74, the methodology 50 continues to a connector 68, and advances to the terminator 70.

Figure 4:
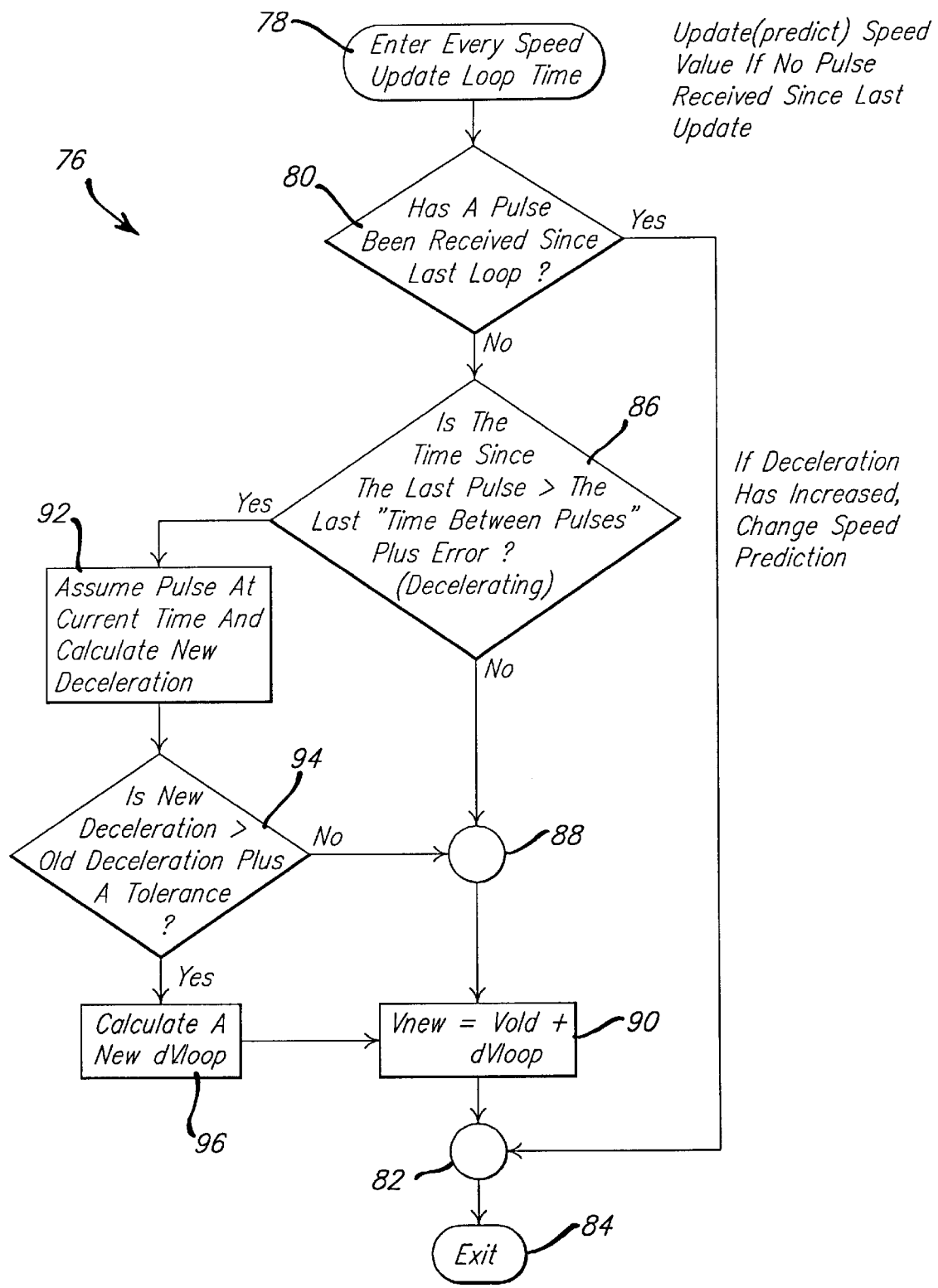
FIG. 4 is a flow chart of an output task methodology for driving a speedometer according to the present invention.

Referring now to FIG. 4, a speed update control methodology 76 of the output task 22 of the present invention is shown in greater detail. The speed update control methodology 76 is executed by entering through an initiator 78 every speed update loop time. This time is set to a predetermined value according to overall system requirements. However, it is preferable that the speed update control methodology 76 be executed once every 50 ms.

From the initiator 78, the methodology 76 continues to a decision block 80, where the system 1 determines if a pulse has been received since the last execution of the speed update control loop methodology 76. If a pulse has been received at the decision block 80 since the last execution of the control loop, the methodology 76 advances to a connector 82, and continues to a terminator 84 pending return through the initiator 78 at the next speed update loop time. However, if a pulse has not been received since the last execution of the control loop, the methodology 76 advances to a decision block 86 where the vehicle acceleration state is determined.

To accomplish this, the time since the occurrence of the last pulse is compared to a time including the previous time 42 plus the system error 48. If the time since the last pulse is less than the time including the previous time 42 plus the system error 48, the methodology 76 advances to a connector 88 and continues to a process block 90 where a new vehicle velocity is determined. If the time since the last pulse is greater than the time including the previous time 42 plus the system error 48, the methodology 76 advances to a process block 92 for further calculations.

In the process block 92, a pulse 34 is assumed to have occurred at the present time. Therefore, a current time 44 is determined, and a new vehicle deceleration value is calculated. It should be appreciated that the new deceleration value is calculated in the same manner as described above with reference to process block 64. From the process block 92, the methodology 76 continues to a decision block 94, where the new vehicle deceleration is compared to the total of the old deceleration plus a calibrated tolerance greater than that required by the value 46. If the absolute value of the new deceleration is less than the absolute value of the total of the old deceleration plus the calibrated tolerance, the methodology 76 advances to the connector 88 where it continues to the process block 90 to calculate the new vehicle velocity.

However, if the absolute value of the new deceleration is greater than the absolute value of the total of the old deceleration plus the calibrated tolerance, the methodology advances to a process block 96 where a new change in velocity per speed update loop time is calculated. It should be appreciated that the new change in velocity is calculated in the same manner as described above with reference to the process block 62. From the process block 96, the methodology 76 continues to the process block 90 where a new vehicle velocity is calculated. From the process block 90, the methodology 76 continues to the connector 82 and to the terminator 84.

According to the above, when the vehicle comes to a stop, a subsequent pulse may not be received in the input task 20 for an extremely prolonged period of time. In this case, the distance between pulses is so great that it indicates the vehicle has completely or almost stopped. The new deceleration value is then calculated based on the current time and the previous time 42 between pulses. A new speed value, based on the deceleration, is calculated every loop time in the output task 22.

Thus, it can be appreciated from the foregoing that the present invention provides a system for calculating vehicle speed from distance pulses utilizing acceleration. The system alleviates the need for smoothing of the signal prior to driving the speedometer. Also, the system utilizes the tolerance of the distance sensor to determine the acceleration, deceleration, or steady state of the vehicle in calculating speed to provide increased accuracy. Thus, the speed of the vehicle is calculated more quickly, accurately and simply than according to the prior art.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method of calculating a vehicle speed of a vehicle comprising:

generating a pulse train corresponding to a speed of said vehicle or a distance traveled by said vehicle;

receiving said pulse train in a controller;

executing a speed input task to determine a first speed and a change in velocity of said vehicle each time a pulse along said pulse train is received in said controller; and periodically executing a speed output task to determine said vehicle speed according to one of a group including said first speed, said change in velocity, and an updated deceleration;

wherein said speed input task comprises:
      determining a current vehicle velocity;
      determining one of a group including an accelerating, decelerating and steady state of said vehicle;
      determining said first speed by multiplying said current velocity by a first factor when said vehicle is in either said accelerating or decelerating state;
      determining said first speed by multiplying said current velocity by a second factor when said vehicle is in said steady state;
      determining said change in velocity when said vehicle is in either said accelerating or decelerating state;
      setting said change in velocity equal to zero when said vehicle is in said steady state; and
      communicating said first speed and said change in velocity to said speed output task.

2. The method of claim 1 wherein said accelerating, decelerating and steady states are determined according to a tolerance of a device generating said pulse train.

3. The method of claim 1 wherein said accelerating, decelerating and steady states are determined by comparing a time including a current time between pulses along said pulse train and a tolerance of a device generating said pulse train to a previous time between pulses.

4. The method of claim 1 wherein:
   said vehicle is in said accelerating state when a current time between pulses along said pulse train plus an error value is less than a previous time between pulses;
   said vehicle is in said decelerating state when a current time between pulses less said error value is greater than said previous time between pulses; and
   said vehicle is in said steady state when not in said accelerating state or decelerating state.

5. The method of claim 1 wherein said pulse train is generated by a distance sensor.

6. The method of claim 1 wherein said speed input task and said speed output task are executed in an engine controller.

7. The method of claim 1 wherein said determination of said first speed comprises:
   multiplying said current velocity by a factor at least equal to a factor multiplying a previous velocity and averaging said current velocity with said previous velocity when said vehicle is in either said accelerating or decelerating states; and
   multiplying said current velocity by a second factor less than said factor multiplying said previous velocity and averaging said current velocity with said previous velocity when said vehicle is in said steady state.

8. The method of claim 1 wherein said determination of said change in velocity comprises:
   dividing a time to velocity conversion constant by a previous time between pulses less a total of a current time between pulses and an error value corresponding to a distance sensor tolerance when said vehicle is in said accelerating state; and
   dividing said time to velocity conversion constant by said previous time less a difference of said current time and said error value when said vehicle is in said decelerating state.

9. A system for calculating vehicle speed comprising:
   a pulse generator for generating a pulse train comprising a plurality of pulses; and
   a controller for receiving said pulse train, executing a speed input task for determining a first speed and a change in velocity of a vehicle each time a pulse along said pulse train is received in said controller, and executing a speed output task for determining said vehicle speed based on one of a group including said first speed, said change in velocity, and an updated deceleration;
   wherein said speed input task comprises:
      determining a current vehicle velocity;
      determining an accelerating, decelerating or steady state of said vehicle according to a tolerance of said pulse generator by comparing a time including a current time between said pulses along said pulse train and said tolerance to a previous time between said pulses along said pulse train;
      determining said first speed by multiplying said current velocity by a first factor, said first factor being at least equal to a factor multiplying a previous velocity, and averaging said current velocity with said previous velocity if said vehicle is in either said accelerating or decelerating state;
      determining said first speed by multiplying said current velocity by a second factor less than said factor multiplying said previous velocity and averaging said current velocity with said previous velocity if said vehicle is in said steady state;
      determining said change in velocity when said vehicle is in either said accelerating or decelerating state;
      setting said change in velocity equal to zero when said vehicle is in said steady state; and
      communicating said first speed and said change in velocity to said speed output task.

10. The system of claim 9 wherein:
   said vehicle is in said accelerating state when a current time between pulses along said pulse train plus an error value corresponding to said tolerance of said pulse generator is less than a previous time between pulses;
   said vehicle is in said decelerating state when a current time between pulses less said error value is greater than said previous time between pulses; and said vehicle is in said steady state when not in said accelerating state or decelerating state.

11. The system of claim 9 wherein said determination of said change in velocity comprises:

dividing a time to velocity conversion constant by said previous time between pulses less a total of said current time between pulses and an error value corresponding to said tolerance of said pulse generator if said vehicle is in said accelerating state; and dividing said time to velocity conversion constant by said previous time less a difference of said current time and said error value if said vehicle is in said decelerating state.

12. A method of calculating vehicle speed comprising:

activating a pulse generator to generate a pulse train comprising a plurality of distance pulses;

receiving said pulse train in an engine controller;

determining a current vehicle velocity each time a pulse along said pulse train is received in said engine controller;

determining an accelerating, decelerating or steady state of said vehicle according to a tolerance of said pulse generator by comparing a time including a current time between said pulses along said pulse train and said tolerance to a previous time between said pulses along said pulse train;

determining a first speed by multiplying said current velocity by a first factor at least equal to a factor multiplying a previous velocity and averaging said current velocity with said previous velocity when said vehicle is in either said accelerating or decelerating states;

determining said first speed by multiplying said current velocity by a second factor less than said factor multiplying said previous velocity and averaging said current velocity with said previous velocity when said vehicle is in said steady state;

determining a change in velocity when said vehicle is in either said accelerating or decelerating states;

setting said change in velocity equal to zero when said vehicle is in said steady state;

setting said vehicle speed equal to said first speed if a pulse has been received since a last execution of a speed output task;

determining if said vehicle has decelerated since a last pulse was received by determining if a time since said last pulse was received is greater than a previous time between pulses along said pulse train plus an error value corresponding to a tolerance of said pulse generator if a pulse has not been received since said last speed output task execution;

determining an updated deceleration by assuming a pulse is received at a present time and dividing a time to velocity conversion constant by a previous time between pulses less a difference of a current time between pulses and said error value if said vehicle has decelerated since said last execution of said speed output task;

determining said vehicle speed according to said change in velocity if a pulse has not been received since said last execution of said speed output task and said updated deceleration is less than a given value; and determining said vehicle speed according to said updated deceleration if said updated deceleration is greater than said given value.

13. The method of claim 12 further comprising executing said speed output task periodically at a fixed output rate.

14. The method of claim 12 wherein:

said vehicle is in said accelerating state when a current time between pulses along said pulse train plus said error value is less than a previous time between pulses;

said vehicle is in said decelerating state when a current time between pulses less said error value is greater than said previous time between pulses; and said vehicle is in said steady state when not in said accelerating state or decelerating state.

15. The method of claim 12 wherein said determination of said change in velocity comprises:

dividing said time to velocity conversion constant by said previous time between pulses less a total of said current time between pulses and said error value if said vehicle is in said accelerating state; and dividing said time to velocity conversion constant by said previous time less a difference of said current time and said error if said vehicle is in said decelerating state.

16. The method of claim 12 wherein said given value is equal to said change in velocity plus said error value.

17. The method of claim 12 wherein said determination of said vehicle speed comprises:

adding said change in velocity to a previous vehicle speed if said updated deceleration is less than said given value; and adding said updated deceleration to said previous vehicle speed if said updated deceleration is greater than said given value.

18. The method of claim 17 wherein said given value is equal to said change in velocity plus said error value.

19. A method of calculating a vehicle speed of a vehicle comprising:

generating a pulse train corresponding to a speed of said vehicle or a distance traveled by said vehicle;

receiving said pulse train in a controller;

executing a speed input task to determine a first speed and a change in velocity of said vehicle each time a pulse along said pulse train is received in said controller; and periodically executing a speed output task to determine said vehicle speed according to one of a group including said first speed, said change in velocity, and an updated deceleration;

wherein said speed output task comprises:

setting said vehicle speed equal to said first speed when a pulse along said pulse train has been received since a last execution of said speed output task;

determining said updated deceleration when said vehicle has decelerated since a last pulse was received if a pulse has not been received since said last execution of said speed output task;

determining said vehicle speed according to said change in velocity when a pulse has not been received since said last execution of said speed output task and said updated deceleration is less than a given value; and determining said vehicle speed according to said updated deceleration when said updated deceleration is greater than said given value.

20. The method of claim 19 wherein said vehicle is decelerating if a time since a last pulse received is greater than a previous time between pulses along said pulse train plus an error value corresponding to a tolerance of a device generating said pulse train.

21. The method of claim 19 wherein said updated deceleration is calculated by assuming a pulse is received at a present time and dividing a time to velocity conversion constant by a previous time between pulses less a difference of a current time between pulses and an error value corresponding to a distance sensor tolerance.

22. The method of claim 19 wherein said given value is equal to said change in velocity plus an error value corresponding to a tolerance of a device generating said pulse train.

23. The method of claim 19 wherein said determination of said vehicle speed comprises:

adding said change in velocity to a previous vehicle speed if said updated deceleration is less than said given value; and adding said updated deceleration to said previous vehicle speed if said updated deceleration is greater than said given value.

24. The method of claim 23 wherein said given value is equal to said change in velocity plus an error value corresponding to said step of generating said pulse train.

25. A system for calculating vehicle speed comprising:

a pulse generator for generating a pulse train comprising a plurality of pulses; and a controller for receiving said pulse train, executing a speed input task for determining a first speed and a change in velocity of a vehicle each time a pulse along said pulse train is received in said controller, and executing a speed output task for determining said vehicle speed based on one of a group including said first speed, said change in velocity, and an updated deceleration;

wherein said speed output task comprises:

setting said vehicle speed equal to said first speed if a pulse has been received since a last execution of said speed output task;

determining if said vehicle has decelerated since a last pulse was received by determining if a time since a last pulse received is greater than a previous time between pulses along said pulse train plus an error value corresponding to a tolerance of said pulse generator if a pulse has not been received since said last execution of said speed output task;

determining said updated deceleration by assuming a pulse is received at a present time and dividing a time to velocity conversion constant by a previous time between pulses less a difference of a current time between pulses and said error value if said vehicle has decelerated since said last execution of said speed output task;

determining said vehicle speed according to said change in velocity if a pulse has not been received since said last execution of said speed output task and said updated deceleration is less than a given value; and determining said vehicle speed according to said updated deceleration if said updated deceleration is greater than said given value.

26. The system of claim 25 wherein said given value is equal to said change in velocity plus said error value.

27. The system of claim 25 wherein said determination of said vehicle speed comprises:

adding said change in velocity to a previous vehicle speed if said updated deceleration is less than said given value; and adding said updated deceleration to said previous vehicle speed if said updated deceleration is greater than said given value.

28. The system of claim 22 wherein said given value is equal to said change in velocity plus said error value.

* * * * *